May 31, 1966     A. CALDERON     3,253,723

METHOD OF AND APPARATUS FOR CHARGING SCRAP

Original Filed March 27, 1956     13 Sheets-Sheet 1

INVENTOR.

ALBERT CALDERON

WILSON, SETTLE, McRAE & CRAIG

ATTORNEYS

May 31, 1966  A. CALDERON  3,253,723
METHOD OF AND APPARATUS FOR CHARGING SCRAP
Original Filed March 27, 1956  13 Sheets-Sheet 2
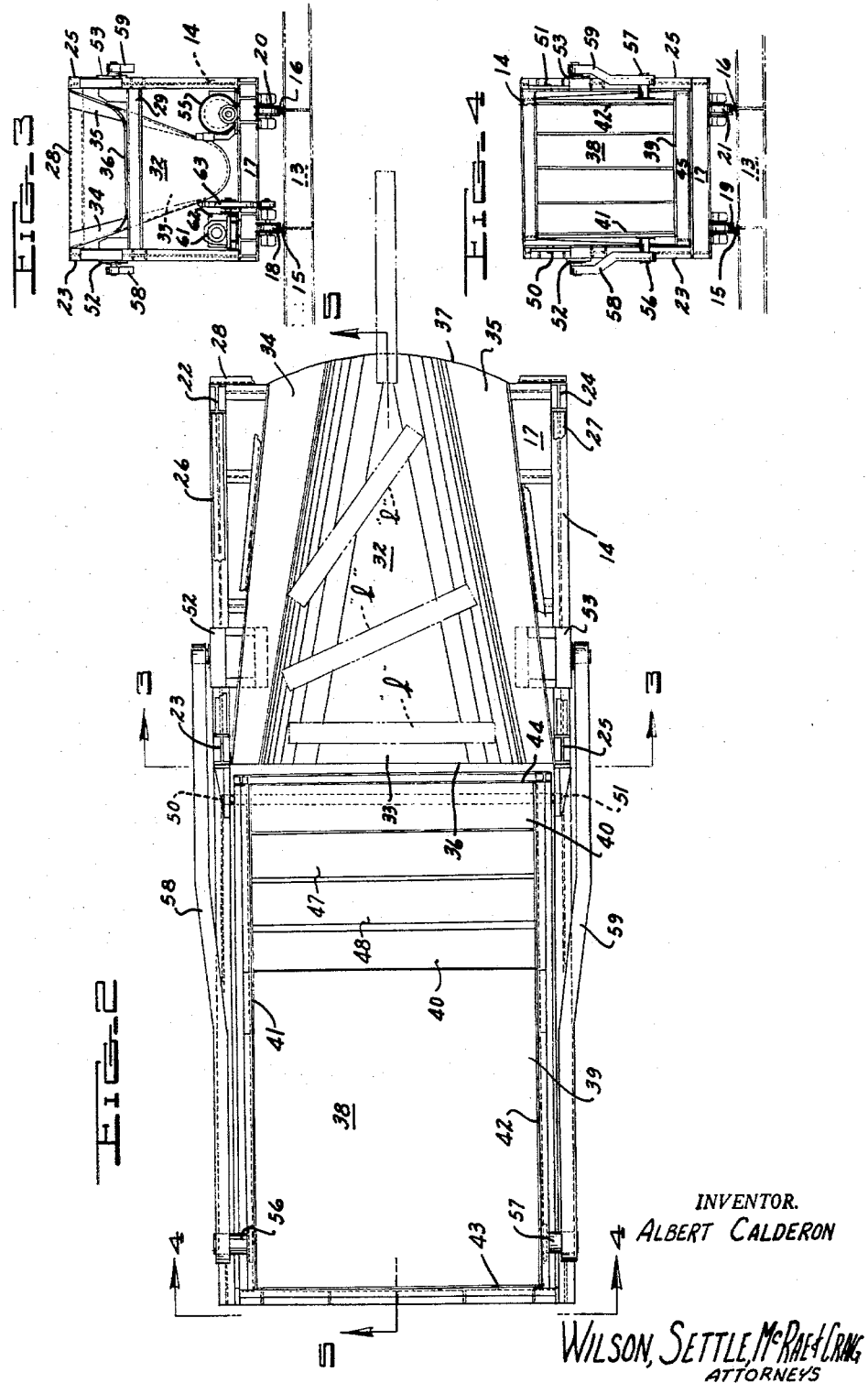
INVENTOR.
ALBERT CALDERON
WILSON, SETTLE, McRAE & CRAIG
ATTORNEYS

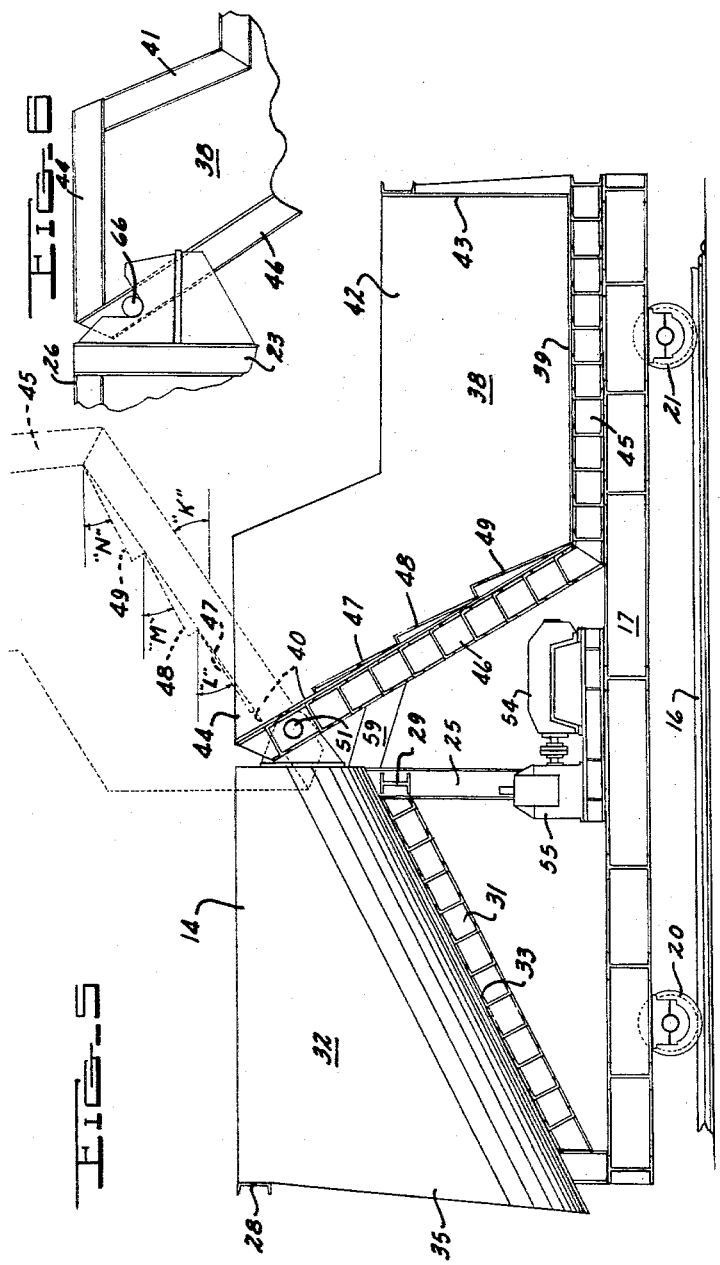

May 31, 1966    A. CALDERON    3,253,723
METHOD OF AND APPARATUS FOR CHARGING SCRAP
Original Filed March 27, 1956    13 Sheets-Sheet 4
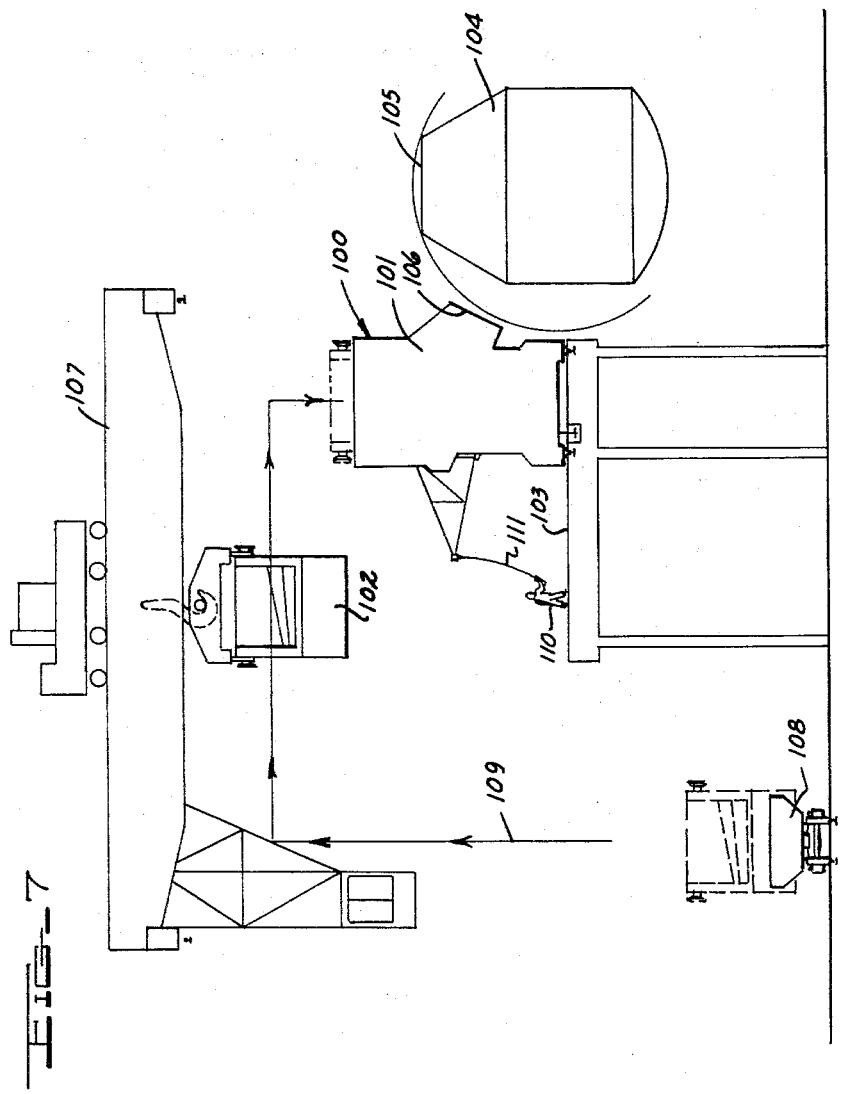
INVENTOR.
ALBERT CALDERON
BY
WILSON, SETTLE, McRAE & CRAIG
ATTORNEYS

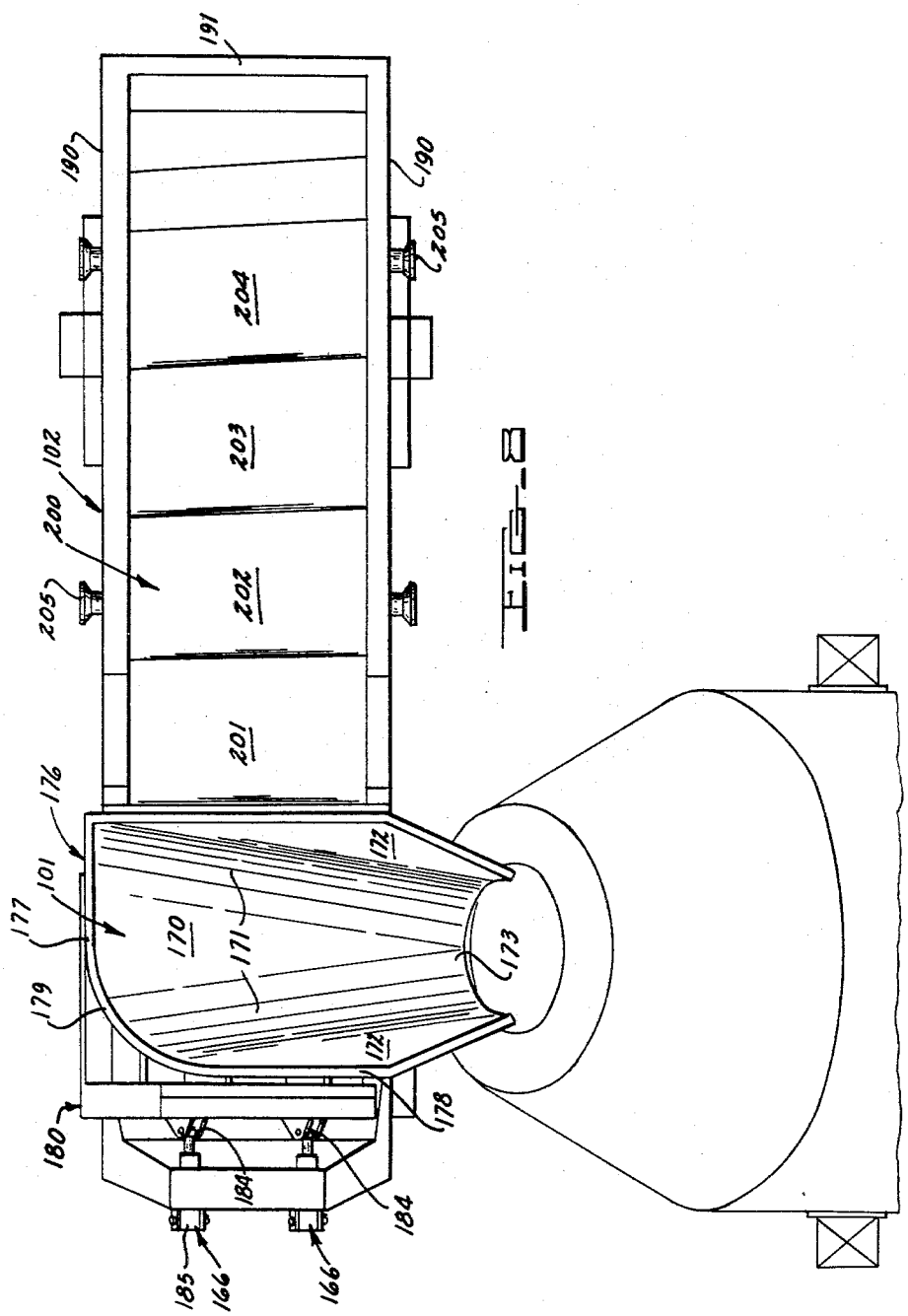

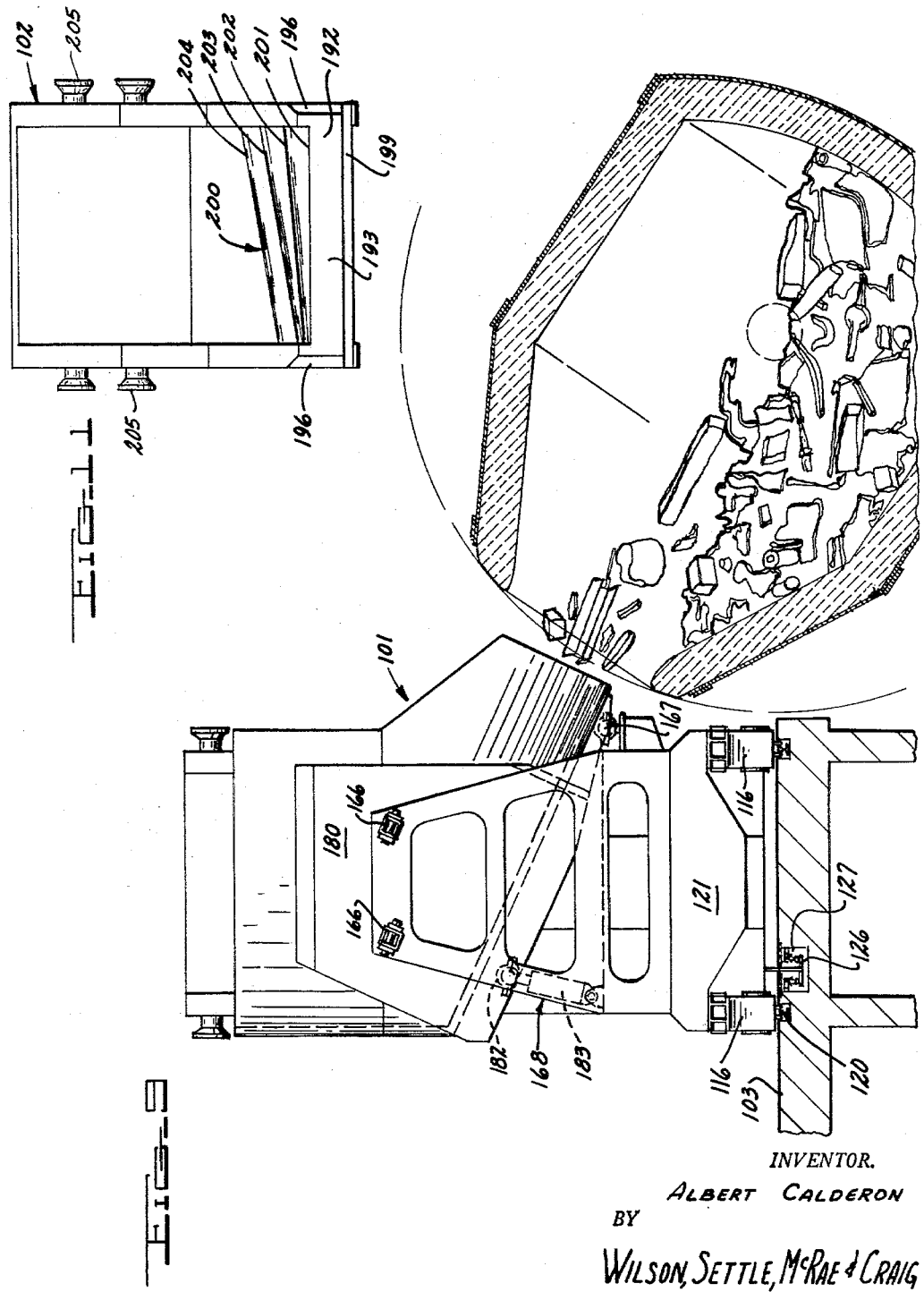

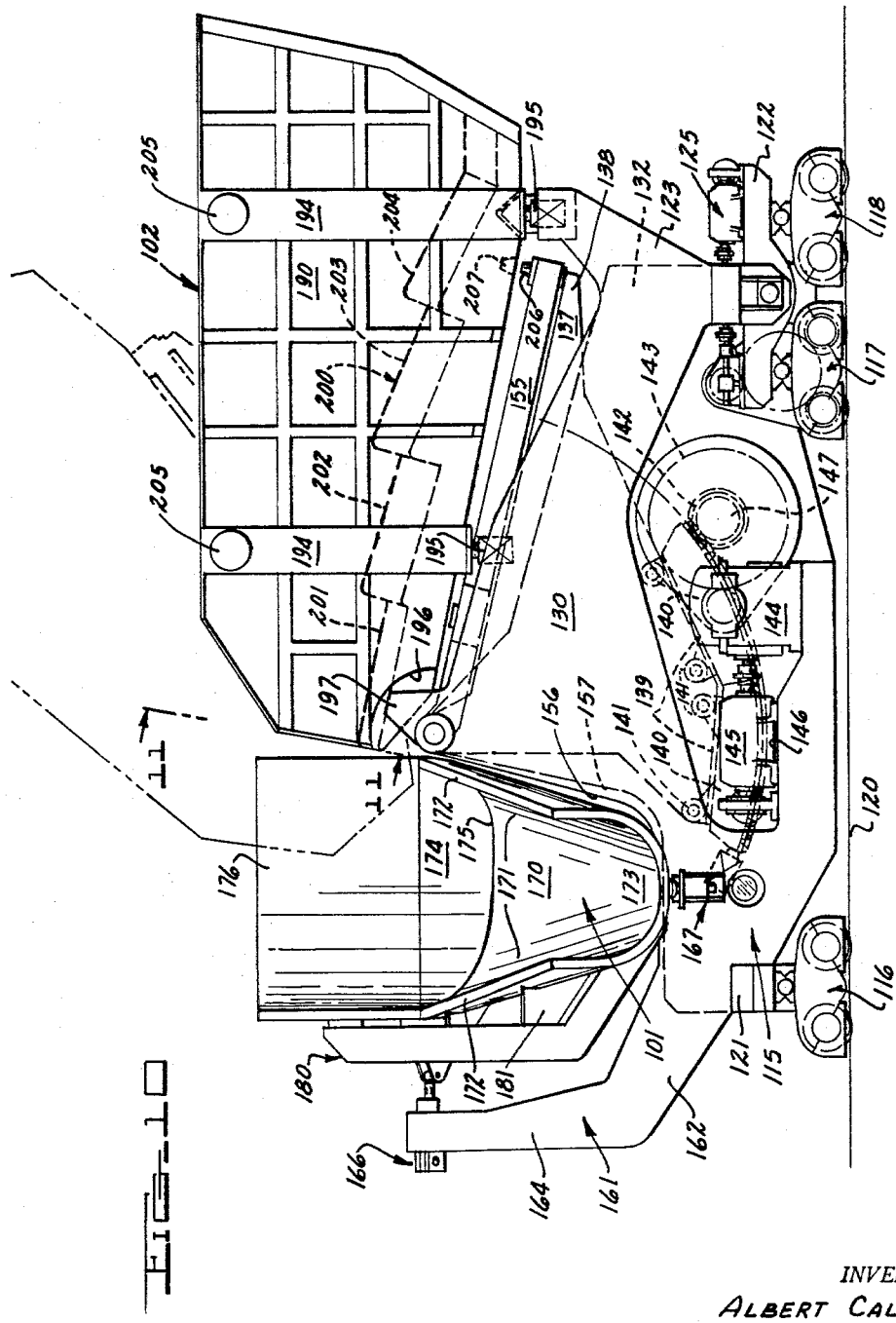

May 31, 1966 A. CALDERON 3,253,723
METHOD OF AND APPARATUS FOR CHARGING SCRAP
Original Filed March 27, 1956 13 Sheets-Sheet 8
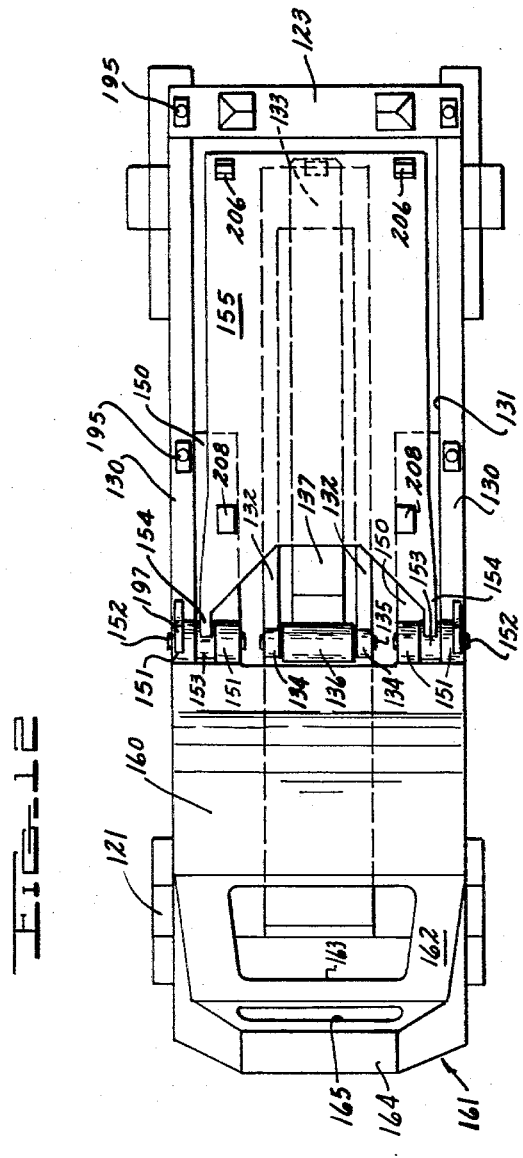
INVENTOR.
ALBERT CALDERON
BY
WILSON, SETTLE, McRAE & CRAIG
ATTORNEYS

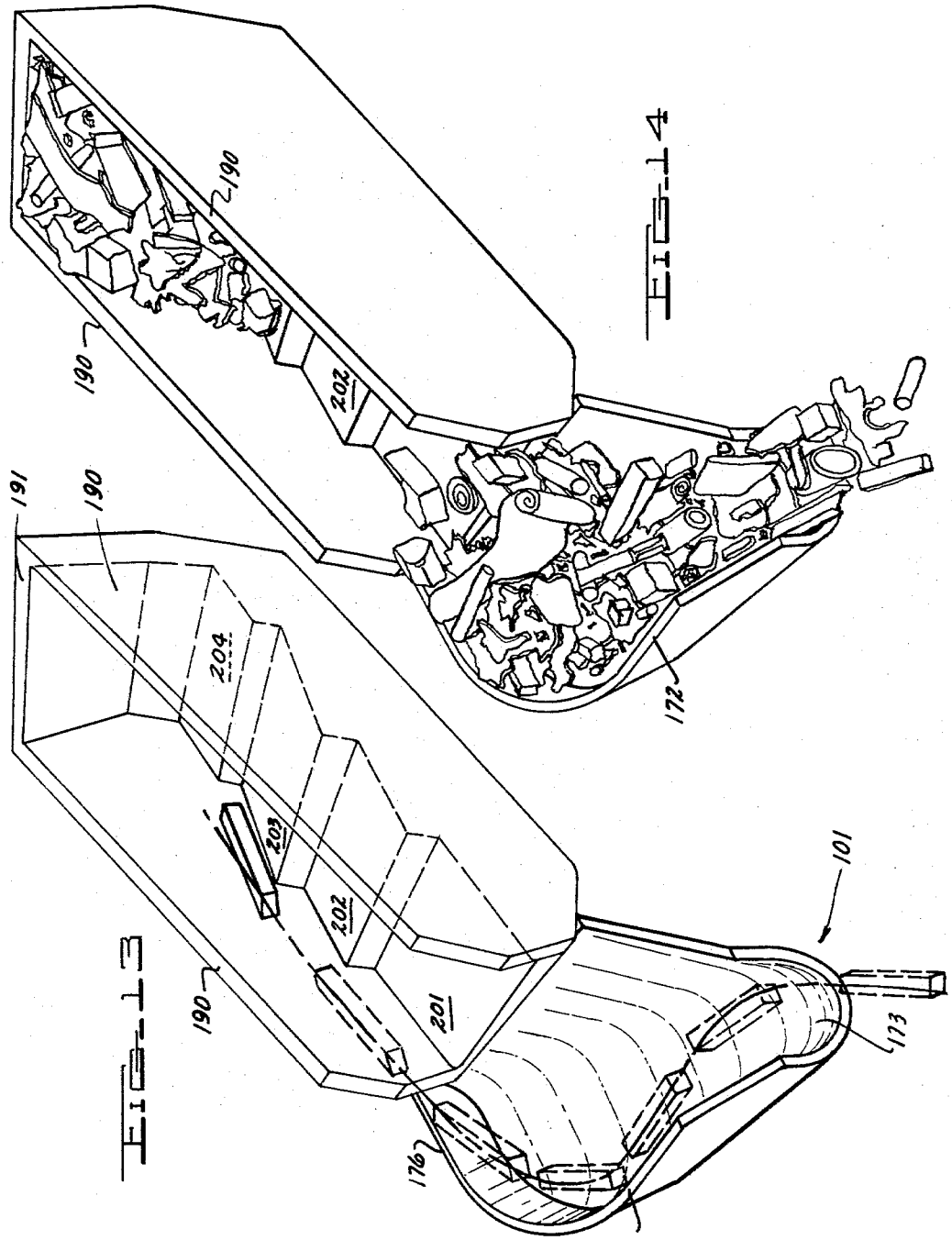

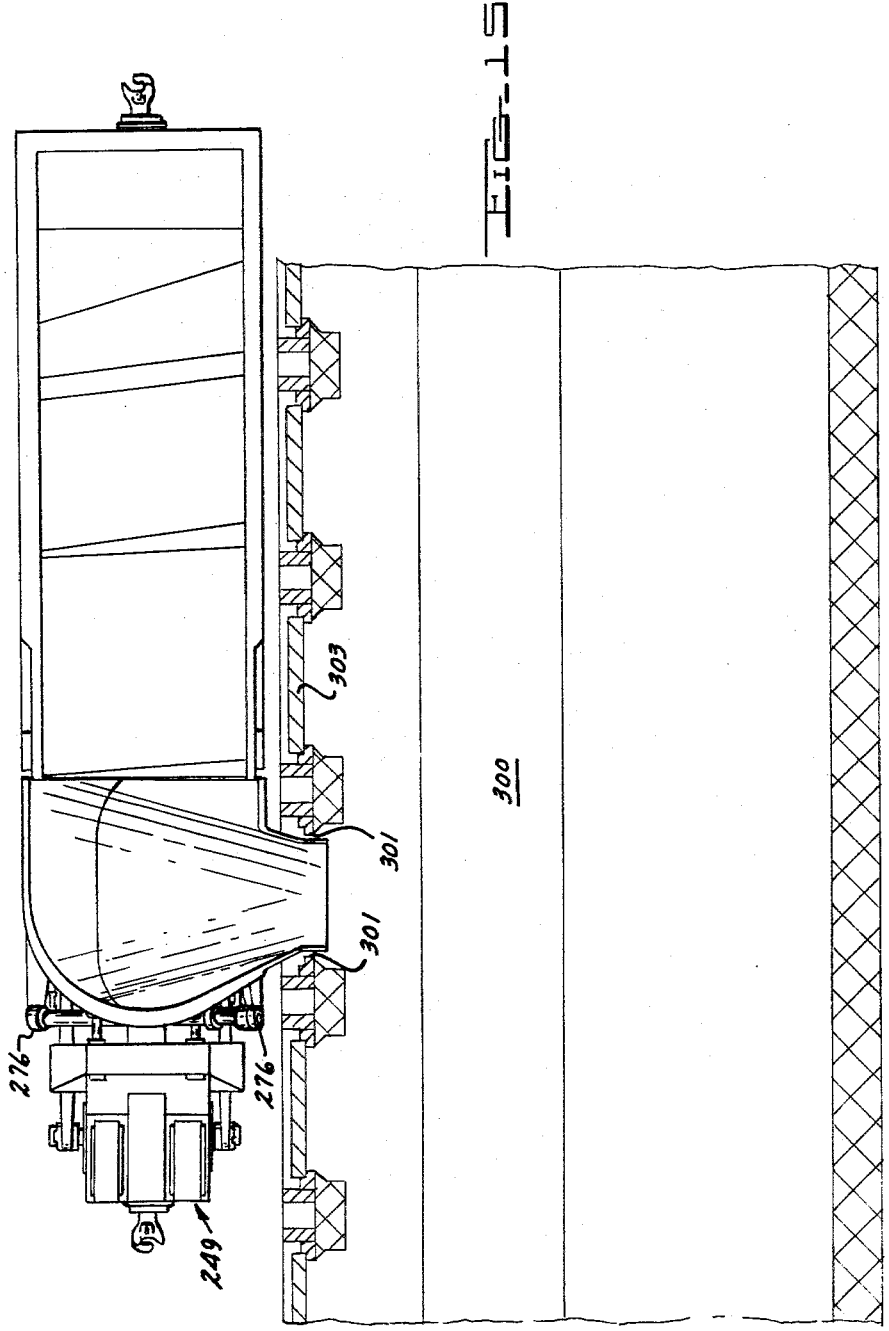

May 31, 1966 A. CALDERON 3,253,723
METHOD OF AND APPARATUS FOR CHARGING SCRAP
Original Filed March 27, 1956 13 Sheets-Sheet 11
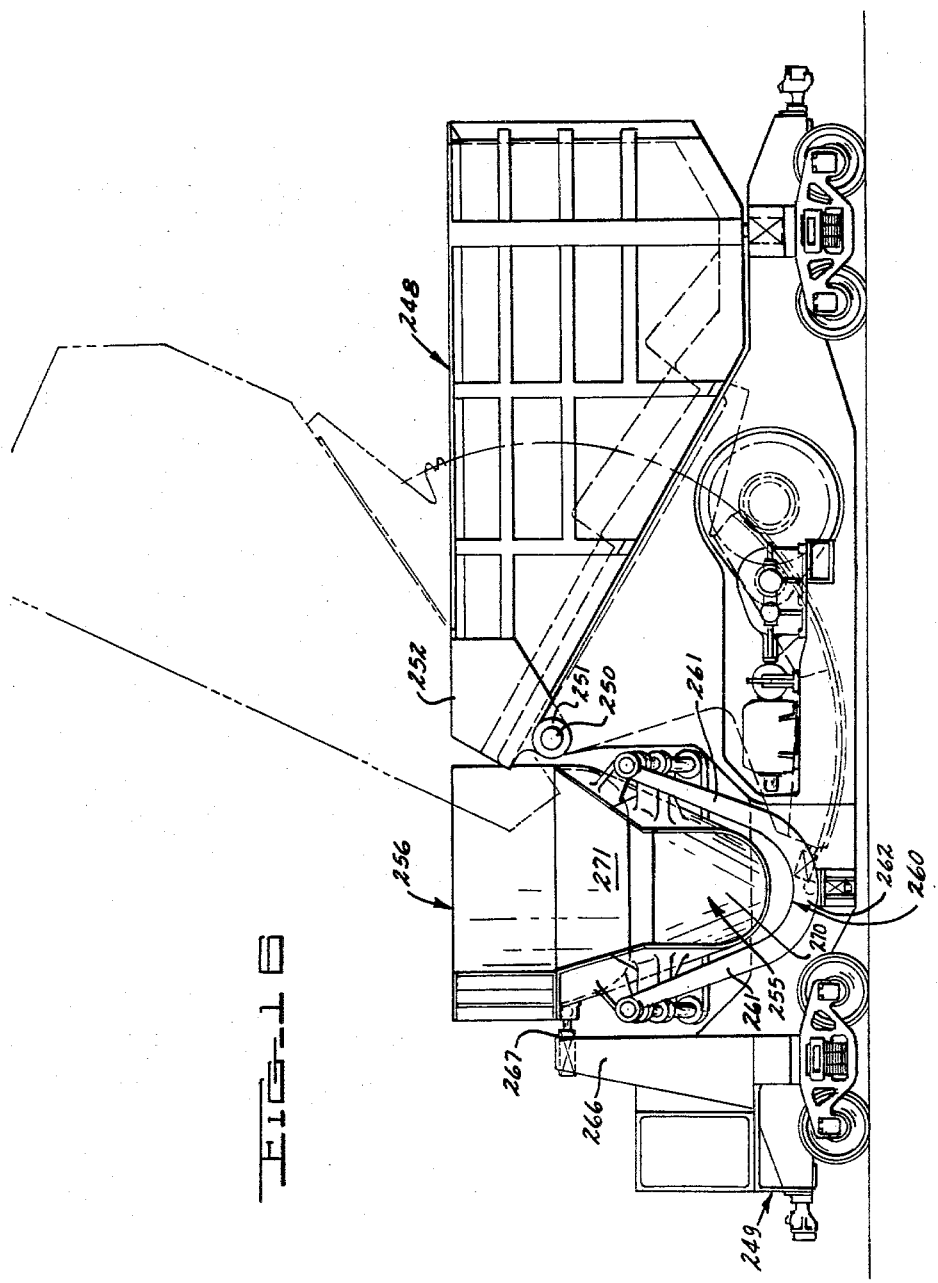
INVENTOR.
ALBERT CALDERON
BY
WILSON, SETTLE, McRAE & CRAIG
ATTORNEYS May 31, 1966 A. CALDERON 3,253,723
METHOD OF AND APPARATUS FOR CHARGING SCRAP
Original Filed March 27, 1956 13 Sheets-Sheet 12
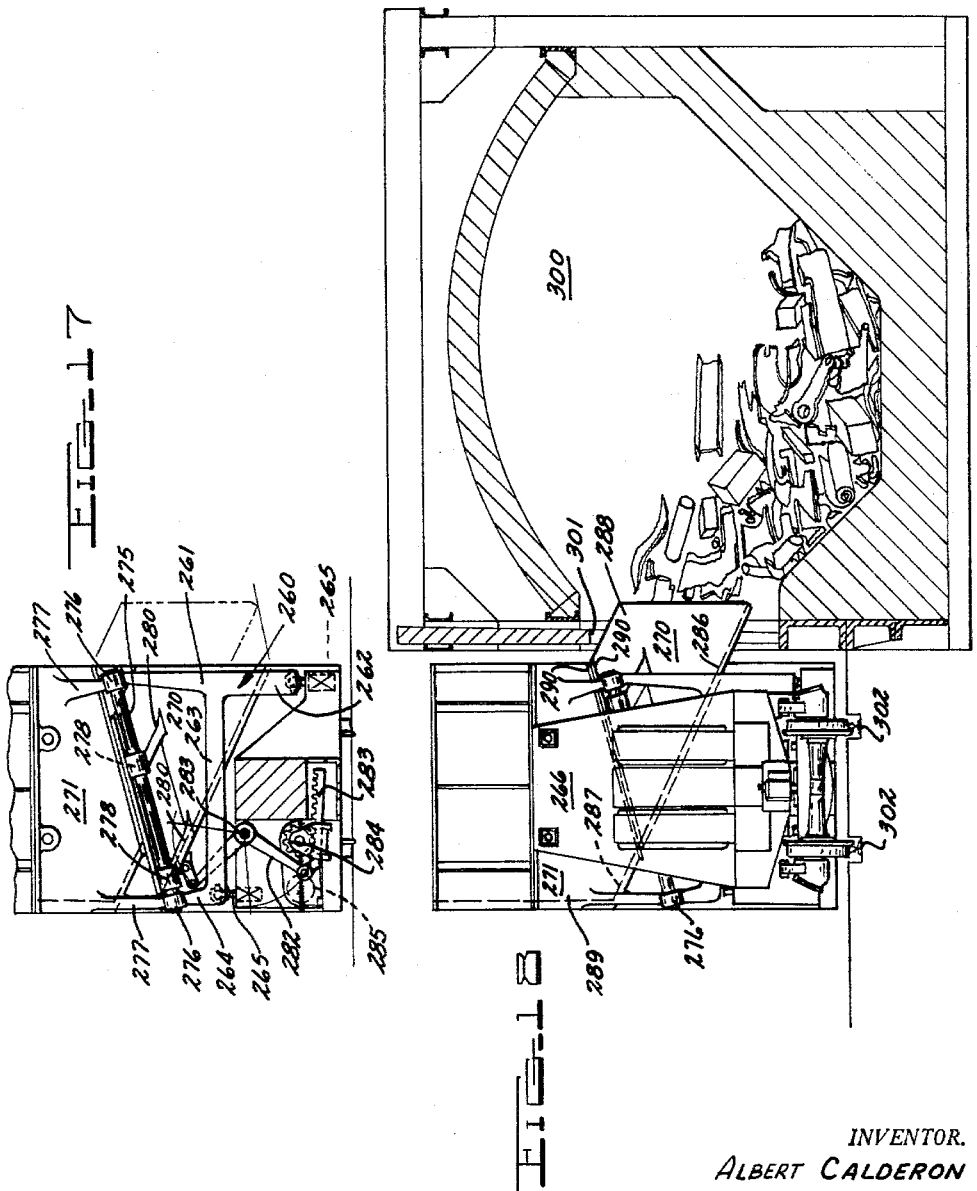
INVENTOR.
ALBERT CALDERON
BY
WILSON, SETTLE, McRAE & CRAIG
ATTORNEYS May 31, 1966 A. CALDERON 3,253,723
METHOD OF AND APPARATUS FOR CHARGING SCRAP
Original Filed March 27, 1956
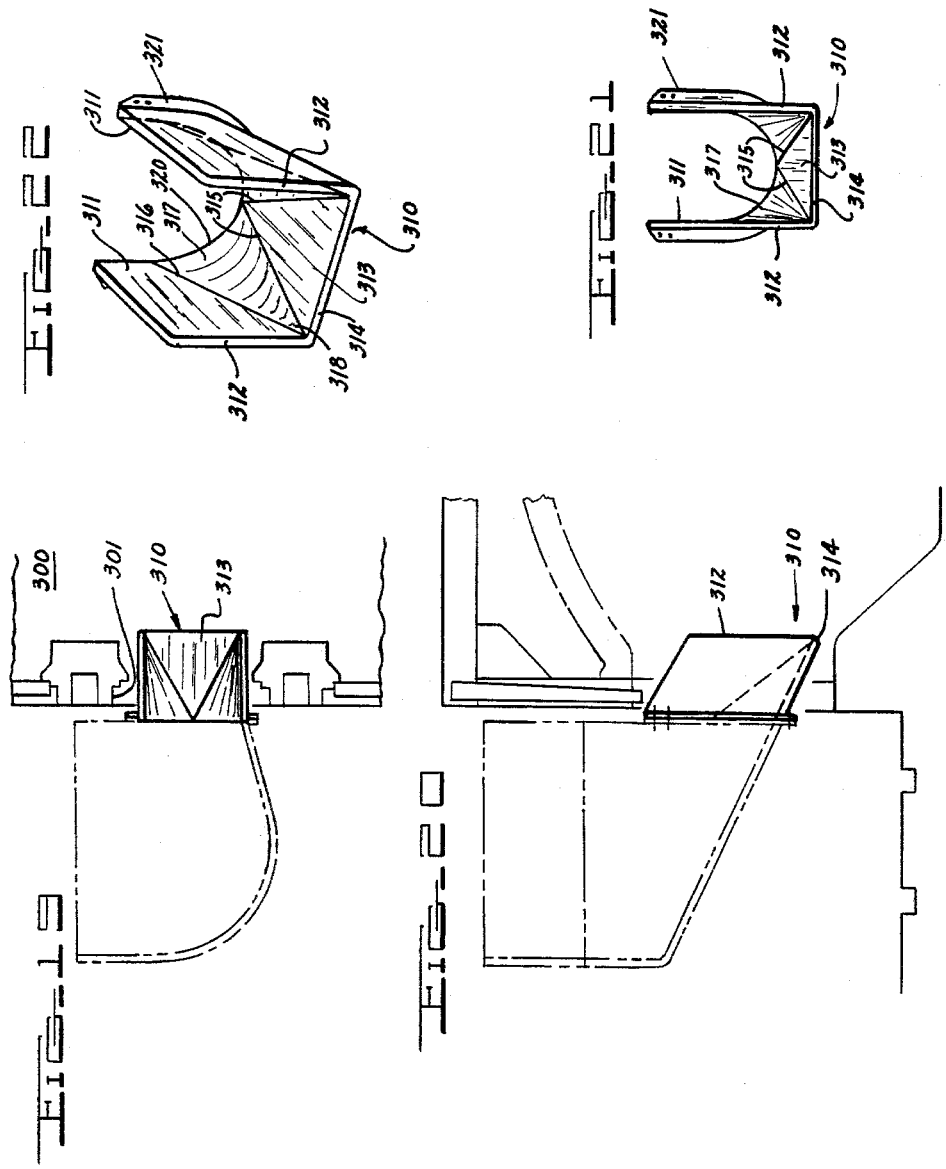
INVENTOR.
ALBERT CALDERON
BY
WILSON, SETTLE, McRAE & CRAIG
ATTORNEYS

United States Patent Office 3,253,723
Patented May 31, 1966

3,253,723
METHOD OF AND APPARATUS FOR
CHARGING SCRAP
Albert Calderon, Cleveland, Ohio, assignor to Calderon
Automation, Inc., Cleveland, Ohio, a corporation of
Ohio
Continuation of application Ser. No. 46,187, July 29,
1960, which is a continuation of application Ser. No.
574,328, Mar. 27, 1956. This application July 29,
1964, Ser. No. 387,546
16 Claims. (Cl. 214—18)

The instant application is a continuation of my copending application, Serial No. 46,187, filed July 29, 1960, now abandoned, which in turn is a continuation of earlier filed application Serial No. 574,328, filed March 27, 1956, now abandoned.

The present invention relates to a method of and apparatus for charging scrap. More particularly, this invention proposes a method of and apparatus for expeditiously introducing oriented miscellaneous scrap or the like into a steel-making furnace, of oxygen converter, open-hearth or electric type, through the restricted charging aperture of the furnace for dispersion interiorly thereof.

In the manufacture of steel in oxygen blown vessels, the steel scrap is charged, molten pig iron and flux materials are added and oxygen is blown under pressure over the charge. Recent studies have shown that with the advent of new furnaces of this type the size of the scrap charge has greatly increased and, therefore, the charging thereof consumes far too much time since no oxygen is blown and no steel is made during this period.

The present scrap charging procedures involve tipping of the vessel to its charging position and introducing the scrap from a series of narrow containers tilted above the angle of repose of scrap after they have been individually positioned in alignment with the mouth of the vessel. This procedure is quite analogous to a "chicken drinking water." The enlargement of the mouth of the vessel to accommodate wider charging containers has been tried but was found impractical because of the splashing and boiling over of the molten metal resulting from the violent reaction occurring during the blowing of the oxygen. Also, because of the violent reaction, a hood is located over the mouth of the vessel during the steel-making process.

In the making of steel in an open-hearth furnace, the scrap is brought to the furnace charging floor in charging boxes loaded on buggies or small flat cars running on rails in front of a battery of furnaces. A charging machine dumps the boxes successively and individually through a selected door of the furnace to be charged, the successive boxes being introduced, inverted and emptied, retracted and replaced on the buggies, until the load is complete. Since an average heat of an open-hearth furnace of usual size may involve a solid charge of about one hundred forty tons, the utilization of successive charging boxes involves the provision of a train of buggies or cars carrying the boxes. As a result of this standard practice, a long charging cycle is neccessary, the furnace charging floor is congested, even to the extent that the doors of adjacent furnaces are blocked by the buggy string, large quantities of heat are wasted through the open furnace doors, and other wasteful procedures result.

In charging an electric furnace, scrap is either charged similarly to the open hearth, presenting the same problem as mentioned, or by top charging with the removal of the roof causing heat losses or taking too long a time. In heavy scrap charging from the top, difficulty may be encountered in replacing the roof back onto the furnace after charging.

The method and apparatus herein proposed makes possible the handling of scrap in a manner far superior to any system heretofore proposed or utilized. Basically, the present invention "pours" into the furnace miscellaneous bulk scrap of variant density and of substantially differing sizes by what is practically a fluid-handling technique. The speed and efficiency of the method and apparatus will be appreciated from the fact that actual tests have been conducted in which seventy tons of scrap have been discharged through a five-foot aperture in twenty-five seconds, or less.

Reduced to its simplest terms, the present invention proposes the introduction of scrap by means of a chute or guide surface, the exit end of which is aligned with the charging aperture of the furnace, and onto which the scrap is impacted with sufficient momentum to cause those scrap portions having a tendency to jam therein to turn and tumble. The scrap flows over the surface, some scrap portions riding on the surface directly, and some others riding on other portions of the scrap, turning and tumbling in such a manner that the very movement and momentum of the scrap itself forces the scrap into longitudinal alignment or "orientation" with the charging aperture. In this manner, long rail sections, pipe, crops, bolsters and the like can be longitudinally aligned with the charging aperture for introduction therethrough and very large quantities of scrap can be poured through the chute in an amazingly short time without jamming therein.

The introduction of the scrap onto the chute with substantial momentum is critical to avoid clogging or jamming of the chute with the scrap. Further, the scrap is introduced onto the chute in controlled amounts, actually in successive batches, in order to keep the scrap in a dynamic state through the chute at all times.

The design and construction of the chute is capable of substantial variation. Generally, the chute may be defined as having side walls which are vertically upwardly extending and which merge through a bottom wall which is arcuate at its area of junction with the side walls. Also, the chute is preferably wider at its entrance end than at its exit end. Due to the orientation which occurs as the scrap material flows over the chute, the greatest cross-sectional dimension of the chute exit opening can be substantially less than the greatest dimension of the scrap fed thereover.

Preferably, the scrap is introduced onto the entrance portion of the chute from a tiltable body provided with a stepped bottom wall from which the scrap portions are intermittently fed to the chute entrance during substantially uniform tilting of the body.

In one version of the invention, the tiltable body is longitudinally aligned with the exit end of the chute, while in another version of the invention the tiltable body lies normal to the axis of the exit end of the chute.

One additional important aspect of the invention resides in the dispersion of the scrap interiorly of the furnace after its introduction through the charging aperture, so as to obtain the desired distribution of scrap across the melting and reaction zone of the furnace. This dispersion effect is particularly well illustrated by the structure wherein the tiltable feeding body lies normal to the axis of the outlet of the chute. The scrap discharged from the tiltable body is turned ninety degrees for discharge from the chute and, during contact with the chute walls, is substantially deflected from its normal straight line gravity path of flow. Because of the great quantities of scrap fed, the scrap rides upon itself, but its desired straight line path is interfered with by the chute and such interference will deflect the scrap stream, causing the scrap to turn and tumble and to flow through the chute in a spiral path, much as a rifle bullet is turned into a spiral path by interference of the lands and grooves of a gun barrel with the desired straight line path of the bullet. The resultant lifting and turning of the scrap and its flow in its spiral path is again interfered with by the somewhat restricted exit opening from the chute. Consequently, after the scrap passes the chute opening, it tends to follow the spiral path, so that it travels laterally as well as longitudinally after leaving the chute. Thus, predetermined dispersion pattern results, and the scrap will be fed in an amazingly uniform distribution pattern over a substantial area of the furnace.

All in all, the analogy between the present invention and fluid handling techniques cannot be overemphasized. The scrap riding over the chute surface and over itself, and having its normal straight line of gravity flow interfered with by the chute surfaces, and by other scrap portions simultaneously passing through the chute, turns and tumbles and orients elongated portions of the scrap into alignment with the charging aperture. The scrap is never at rest on the chute surface but rather is impacted thereon with substantial momentum, and this very momentum further increases the flow rate to the point at which individual scrap pieces merge into the overall flow.

It is, therefore, an important object of the present invention to provide a new and improved method of and apparatus for the feeding of scrap to a steel making furnace through a charging aperture.

Another important object of this invention is the provision of an improved method of feeding miscellaneous bulk scrap by impacting the scrap on a chute having an exit opening aligned with a steel making furnace aperture, the scrap being impacted on the chute with sufficient momentum to effect interference with and variance from the normal path of scrap flow, the various portions of the scrap being turned and tumbled by their interference with the chute and with other scrap portions being fed therethrough simultaneously to align elongated pieces of scrap longitudinally with the furnace aperture.

It is a further object of this invention to provide an improved apparatus for the loading of scrap through a steel making furnace charging aperture and including a chute having an exit end aligned with the aperture and means for impacting scrap on the chute with substantial momentum and in successive quantities sufficient to induce and maintain a flow of the scrap through the chute.

Yet another object of this invention is the provision of a method of introducing scrap through the charging aperture of a steel making furnace by importing substantial momentum to the scrap, interfering with the free flow of scrap to cause the scrap to turn and tumble upon itself, and discharging the scrap from an opening located substantially at the charging aperture with substantial momentum so that the scrap may spread and disperse itself within the furnace.

It is still another object to provide an apparatus for the charging of scrap into a steel making furnace through a restricted charging aperture through a chute having upwardly divergent side walls convergent toward the charging aperture and having an entrance portion onto which scrap is introduced with substantial momentum from a tiltable feed body for flow across and interference with the chute walls and finally for discharge through the exit opening into the aperture of the furnace.

A still further important object is the provision of a method of charging scrap into a steel making furnace by impacting scrap on an orienting surface with substantial momentum, forcibly deflecting the scrap through an angular change of substantially ninety degrees to impart an overall spiral motion to the scrap stream, discharging the scrap through a restricted outlet while the scrap is traveling in its spiral path, and accommodating lateral spreading and dispersion of the scrap due to the spiral path after its passage through the restricted outlet.

It is yet another, and no less important, object of this invention to provide an apparatus for feeding scrap into a steel making furnace and including a chute having its inlet and outlet extremities disposed normally, one to another, and joined by arcuate chute side and bottom walls, and a tiltable body longitudinally aligned with the inlet end of the chute and adapted to contain a body of scrap to be introduced into the scrap inlet end as the body is tilted.

Other objects of this invention will appear in the following description and appended claims, reference being had to the accompanying drawings forming a part of this specification wherein like reference characters designate corresponding parts in the several views.

On the drawings:

FIGURE 2 is a plan view of the apparatus;

FIGURE 3 is a transverse sectional view, on a reduced scale, along the plane 3—3 of FIGURE 2;

FIGURE 4 is a transverse sectional view, taken along the plane 4—4 of FIGURE 2;

FIGURE 5 is a longitudinal sectional view taken along the plane 5—5 of FIGURE 2;

FIGURE 6 is a fragmentary elevational view showing a pivot arrangement of a preferred construction used if the body of the apparatus is detachable for loading purposes;

FIGURE 7 is a schematic view, similar to FIGURE 1 illustrating a modified form of apparatus and its utilization in the charging of oxygen blown converters;

FIGURE 8 is a plan view of the modified apparatus shown in FIGURE 7;

FIGURE 9 is an end view of the apparatus of FIGURES 7 and 8, and illustrating the apparatus in operation;

FIGURE 10 is a side elevational view of the modified apparatus of FIGURES 8 and 9;

FIGURE 11 is an end elevational view of one portion of the apparatus taken along the plane 11—11 of FIGURE 10;

FIGURE 12 is a fragmentary elevational view of the supporting framework of the apparatus with the chute and feed body removed;

FIGURES 13 and 14 are diagrammatic illustrations showing the flow of scrap to, over and through the chute;

FIGURE 15 is a plan view of another modified form of apparatus of the present invention utilized for the feeding of scrap to an open hearth furnace;

FIGURE 16 is a side elevational view of the modified apparatus shown in FIGURE 15;

FIGURE 17 is an end elevational view of the modified apparatus;

FIGURE 18 is a view similar to FIGURE 17, utilizing the apparatus in operation;

FIGURE 19 is a plan view of a modified chute extension for utilization with that form of the invention illustrated in FIGURES 15 through 18;

FIGURE 20 is a side elevational view of the modification of FIGURE 19;

FIGURE 21 is a front elevational view of the embodiment of FIGURES 19 and 20; and FIGURE 22 is a perspective view of the modification.

Figure 1:
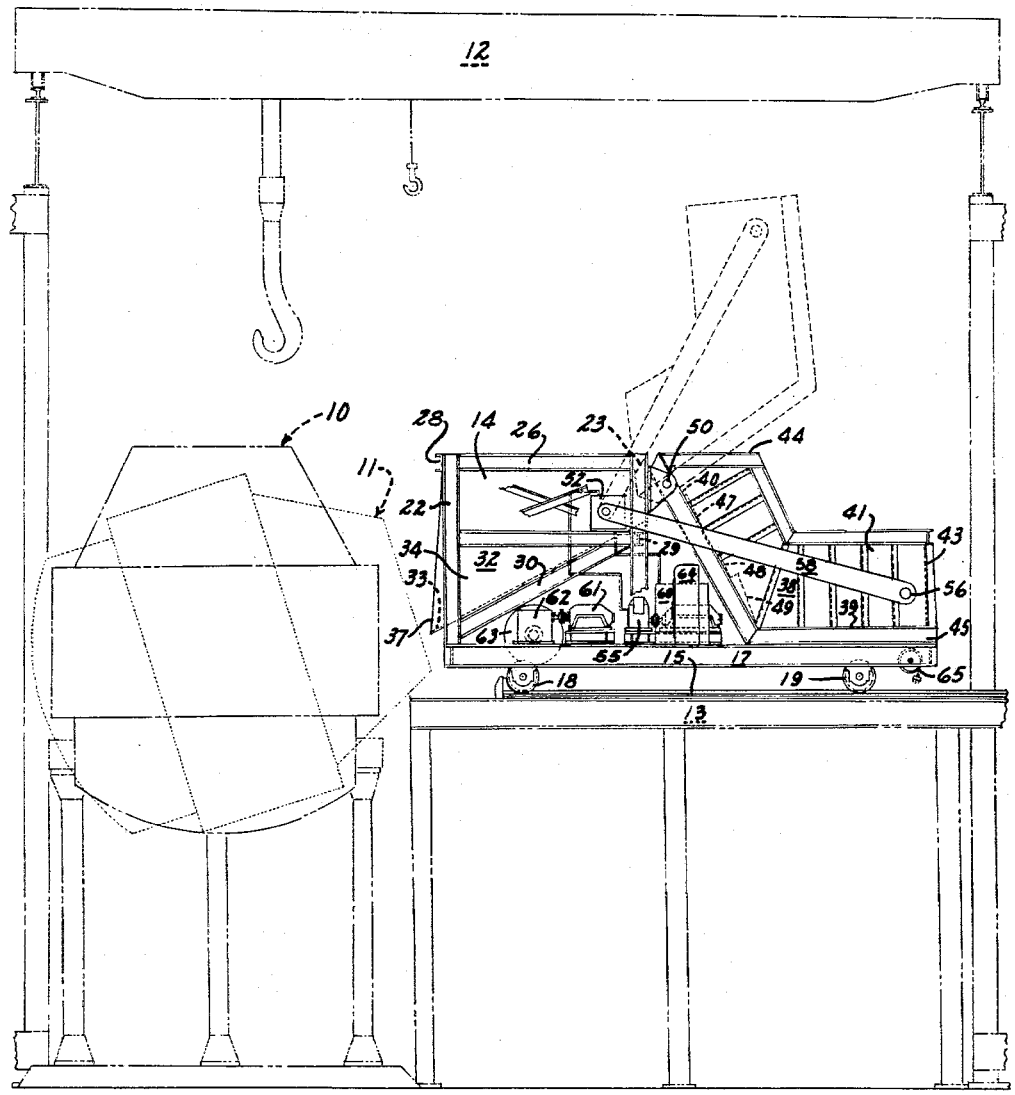
FIGURE 1 is a side elevational view, somewhat schematic, of one of a plurality of oxygen blown vessels having one form of the apparatus of the present invention located on a track in front of the vessel to be charged.

*The embodiment of FIGURES 1 through 6*

Referring to the drawings, 10 is the oxygen blown vessel, often called "converter," in the blowing position and 11 is the vessel in the tipped position; ladle crane 12 spans over vessel 10 and charging floor 13, on which floor charging apparatus 14 travels. Laddle crane 12 serves to handle and charge ladles of molten metal.

Apparatus 14 which runs on rails 15 and 16 comprises a carriage or base 17 made up of horizontal members substantially in the form of a rectangle in plan, and mounted on track wheels 18, 19, 20 and 21 which wheels are of suitable size, equipped with appropriate bearing supports. Vertical columns 22, 23, 24 and 25 extend from carriage 17 and are tied together by horizontal cross-members 26, 27, 28 and 29. Between columns 22 and 23, and between columns 24 and 25, diagonal beams 30 and 31 are, respectively, disposed in such a way that their angle of inclination is greater than the angle of repose of steel scrap. From full size experiments conducted, the most suitable angle was to range from 25 to 45 degrees. Diagonal beams 30 and 31 are spanned by a plurality of cross-members arranged in close proximity to provide very sturdy foundation for orientation chute 32.

Orientation chute 32, which never has scrap within it in a static condition and which serves to orient scrap before discharging it into the vessel, comprises a triangular bottom 33, the apex of which lies closely adjacent the chute discharge end, on which scrap falls with great impact and slides downwardly; sides 34 and 35 to orient and confine the scrap; receiving end 36 where scrap enters; and discharge end 37 where oriented scrap leaves chute 32 with a great trajectory into the vessel 11. Side 34, bottom 33 and side 35 form a trough-like chute, with a curvature between side 34 and bottom 33 and between side 35 and bottom 33. Chute 32 converges conically or otherwise toward discharge end 37, but preferably the curvature between side 34 and bottom 33, and between side 35 and bottom 33, is made with the same radius and the distance between the points of tangency of the curvature with bottom 33 at receiving end 36, decreases as approaching discharge end 37 and even terminates at a point to form a semicircle with sides 34 and 35 being vertical, or to form a sector preferably, with sides 34 and 35 divergent upwardly so the openings of receiving end 36 and discharge end 37 are narrower at the bottom than at the top.

Since the nose diameters of vessels range from five to eight feet, for practical purposes it is preferred to have the radius of curvature to roughly range from twenty-four to thirty-six inches. Chute 32 is made from material having very tough wearing properties, such as manganese steel, and bottom 33, sides 34 and 35 are reinforced to take the abuse caused by falling and sliding scrap.

Beyond columns 23 and 25, which columns are located about the middle of the longitudinal axis of carriage 17, body 38 is located, as shown by full-line load receiving position. Body 38 is preferably made up of flat bottom 39, stepped incline 40, sides 41 and 42, back 43 and feeding end 44. On the underneath side of bottom 39 and include 40, bead-and-stiffener assemblies 45 and 46 are provided for reinforcement. It is preferred to have assembly 45 form an obtuse included angle with assembly 46. Sides 41 and 42 are vertically disposed to assemblies 46 and 45, and preferably, with a small divergence (not shown) toward feeding end 44. Vertical reinforcement members are disposed to sides 41 and 42 on the outside faces thereof for rigidity. Back 43 closes the respective ends of sides 41 and 42 toward the end of carriage 17, and gusset plates are disposed to back 43 for reinforcement.

Stepped incline 40 which forms an obtuse included angle with bottom 39 is made up of a plurality of inclined steps, such as steps 47, 48 and 49. In contrast to incline 40, step 47 forms a smaller angle with the horizontal than incline 40; step 48 forms a smaller angle with the horizontal than step 47, and step 49 forms a smaller angle with the horizontal than step 48. Assuming that K, L, M and N are the respective angles formed with the horizontal by incline 40, step 47, step 48 and step 49, the feeding of scrap is controlled by steadily tilting body 38; the feeding is terminated when body 38 is in the extreme position, as shown by dotted outline in FIGURES 1 and 5.

Body 38 is pivotally mounted by means of pin-and-bearing assemblies 50 and 51, these assemblies being preferably attached to columns 23 and 25.

Two fluid oscillating drives 52 and 53 are provided to supply the necessary torques to tilt body 38. These drives may take the form of the type made by any one of the several available in the market. Motor 54 and pump 55 are used to supply fluid under pressure for the operation of drives 52 and 53.

Trunnions 56 and 57 are respectively disposed to sides 41 and 42 of body 38, with lever arm 58 connecting drive 52 to trunnion 56, and lever arm 59 connecting drive 53 to trunnion 57. Tank 60 is provided on carriage 17 to store the fluid used. On top of carriage 17 and beneath chute 32, motor 61 is mounted to provide traction to wheel 20 through reducer 62 and appropriate gearing 63, in order to move the complete apparatus 14 to and from the vessel charged. Control cabinet 64 is located between chute 32 and body 38, and cable reel 65 is provided to connect to a receptacle and bring power.

*The operation of the embodiment of FIGURES 1 through 6*

In operation, after tapping the heat, the vessel is tipped to position 11, as shown by the dotted outline, and apparatus 14 is moved to position, as shown in FIGURE 1, by manipulation of a suitable electrical control (not shown). By manipulation of another suitable control valve (not shown) fluid is pumped to drives 52 and 53, causing lever arms 58 and 59 to travel through an arcuate path in a counterclockwise direction, to thereby tilt body 38. Some scrap starts flowing from feeding end 44 of the body 38 to receiving end 36 of the chute 32 as soon as the angle K is greater than the angle of repose of the scrap, but the remainder of the scrap stays in a static condition even though bottom 40 of the body 38 exceeds said angle of repose. As the body 38 is being tilted further, there is another flow of more scrap from step 47 as soon as angle L exceeds said angle of repose, and as body 38 is being tilted further still, there is still another flow of more scrap from step 48 as soon an angle M exceeds said angle of repose, and as the body 38 is being tilted further yet, there is yet another flow of more scrap from step 49 as soon as the angle N exceeds said angle of repose. This gradual and intermittent feed, controlled by the angles of inclination of the various steps, is of utmost importance, as the orientation of scrap by means of chute 32 cannot be accomplished unless certain important factors are considered. Without orientation, no scrap can be transferred from the body 38, which contains the complete scrap charge, into the vessel since feeding end 44 is far greater than the mouth of the vessel.

It is a well known fact that any body, hereinafter referred to a *b*, having an initial velocity of zero, is pulled by gravity down an inclined plane a distance of sixteen (16) feed/second less the retarded distance caused by friction, during the first second. If *b* does not slide down an incline plane whose angle of elevation is greater than the angle of repose of *b*, it means that the retardation caused by friction is greater than the gravity pull. This retardation, in a converging chute which is tilted more than the angle of repose of *b*, is not caused only by sliding friction but also by the wedging effect commonly known as "jamming." Full size experiments with chute 32 and having a weight of twenty-two (22) tons proved that in order to overcome jamming and thereby accomplish orientation of scrap which is the roughest material to handle, the following points should be taken into consideration:

(1) Chute 32 is normally empty, namely, it cannot have any scrap in a static condition. If there were any, and scrap is fed from body 38, the new scrap would wedge the scrap resting within chute 32 and jam it to such an extent that the only way to unplug the chute 32 would be to cut the scrap into small pieces with burning torches.

(2) Great initial momentum must be imparted to the scrap to be oriented as it starts sliding, so that when it rubs and interferes with and against the curves of the chute 32, the scrap has enough kinetic energy that it overcomes all interference by turning, tumbling and twisting in order to emerge oriented from discharge end 37.

(3) Chute 32 is provided with the most effective angle of inclination discovered through experimentation.

(4) Chute 32 converges longitudinally toward discharge end 37 to force the scrap to emerge longitudinally therefrom.

(5) Chute 32 is provided with a special curvature so as to greatly reduce friction between the surfaces of contact and also to throw-off balance the scrap in order to precipitate the turning, tumbling and twisting action.

(6) Body 38 must feed scrap intermittently into chute 32 in order to give enough time for the clearance of chute 32 before a subsequent feed; otherwise, jamming is most certain to occur. In practice, it was found that when too much scrap was fed at one time, there was little room for turning, tumbling and twisting within the chute 32. However, with an interval of only three (3) seconds between feeds, there was no jamming.

(7) Bottom 33 of the chute 32 is flat in order to eliminate the possibility of perpendicular wedging which is likely to occur with beams and bundles.

(8) Sides 34 and 35 of the chute 32 diverge upwardly or, conversely, converge downwardly, to reduce the robbing of momentum from scrap when the convergence and curvature interfere with the side climbing action of the scrap which occurs before orientation.

The instant apparatus is capable of delivering a charge equal to seventy (70) tons of scrap into the vessel 11, in roughly one-half (½) minute. The raising of the body 38 is steady but the feeds of scrap, because of the steps, are short and intermittent. The time taken by chute 32 to orient one feed and clear itself of the oriented scrap is variable, depending upon the type of scrap handled. Once the body 38 reaches the position shown by the dotted outline, by manipulation of a control valve (not shown), it is lowered to the loading position and apparatus 14 is moved from the vessel 11 to the stockyard for receiving another load of scrap.

It is obvious that the tilting of the body 38 can be effected by several other ways than that described hereinbefore, such as by means of cylinders, gear quadrants, crane, hoist, etc. Also, instead of providing a traction drive for the carriage 17, a car puller, a locomotive, etc., can be utilized to move the apparatus 14 from the loading area to the front of the vessels. Further, the body 38 can be made to detach from the remainder of the apparatus 14 in order to transport it, by crane or otherwise, to and from the apparatus 14 so as to obviate the necessity of moving the complete apparatus to and from the floor 13. In case it is desired to detach the body 38, a pivot arrangement 66 is provided, as shown in FIGURE 6, to facilitate the placing on and removal from the carriage 17 of the body 38.

The embodiment of FIGURES 7 through 14

The embodiment of the invention illustrated in FIGURES 7 through 14 is schematically represented in FIGURE 7 and is indicated thereon by reference numeral 100.

Once again, the apparatus is in two parts, including a first chute part 101 and a second removable body part 102, as will be hereinafter more fully described.

The apparatus 100 is supported upon a charging floor 103 located at the proper level to insure discharge of the scrap into the reaction or oxygen blowing vessel 104. This vessel is, of course, tiltable about a horizontal axis to bring the mouth 105 of the vessel into registry with the discharge end 106 of the chute part 101 of the apparatus 100. An overhead crane 107 is utilized to rectilinearly move one of a plurality of body parts 102 from corresponding flat cars 108 or similar supply means through the path indicated by directional arrows 109 for placement in the apparatus 100 to supply scrap to the vessel 104, as will be hereinafter described in greater detail. The apparatus is controlled by a workman 110 having a pendant push button control 111 whereby the tilting of the supply hopper or body 102 can be controlled at the steel making station and from the charging floor 103.

As best illustrated in FIGURE 10, the mechanism of the present invention includes a chute assembly 101, a supply hopper or body 102 and a common supporting truck 115. Considering first the base 115, the base 115 is mounted upon trucks 116, 117 and 118, adapted to travel through double flanged wheels on rails 120 recessed into the charging floor 103 (see FIGURE 9). The trucks 116 at the chute end of the base 115 are connected by end sill 121 while the trucks 117, 118 at the hopper end are spanned by spreaders 122 carried by a sill 123 at the rear end of the apparatus.

Mounted upon the spreaders 122 are the drive components 124 for moving the apparatus 100 along the rails 120. The drive components 125, including a rail collector mechanism depending from the rear trucks 117, 118, are connected to an electric supply 127 recessed in the charging floor 103, as best seen in FIGURE 9. Additionally, the mechanism 125 for driving the apparatus 100 along the rails 120 includes an electric motor, gear reduction units, and wheel drive transmission mechanism.

As best illustrated in FIGURES 10 and 12, the frame or undercarriage of the apparatus 100 comprises massive side plates 130 joined at their ends by the sills 121 and 123 and enclosing a central open space 131 therebetween. A pair of central support plates 132 lie parallel with the side plates 130 and are likewise joined to the end sills 121 and 123. These central support plates 132 are joined, as at 133, adjacent their rear ends and are integrated into the sill structure supporting the rear trucks 117, 118.

The support plates 132 are provided adjacent their upper ends with support bearings 134 within which is disposed a transversely extending, horizontally disposed hinge pin 135. Supported on this hinge pin 135 is a central bearing bushing 136 rigidly secured to a rack support element 137 which extends vertically between and parallel to the intermediate support plates 132. This rack support member 137 has a rearwardly extending projection 138 and a lower angularly cut surface 139 to which is secured a pair of cooperating segmental gear sections 140, by suitable means, as by bolts 141 (see FIGURE 10). These segmental gear sections 140 cooperably present a gear or rack surface which contacts a pinion 142 concentric with a substantially larger drive gear 143 with which the pinion 142 is co-rotatable. A change speed transmission unit 144 is positioned to drive the input gear 143 and the pinion 142, the transmission unit 144 being in turn driven by one or more electric motors 145 supported on a support surface 146 provided by the side plates 130 adjacent the lower extremities thereof. The gear 143 and the pinion 142 are carried by a shaft 147 journaled by the intermediate support plates 132, the pinion 142 being radially aligned with and in mesh with the rack segments 140.

Carried by the side plates 130 and support brackets 150 mounted thereon are spaced bearing bushings 151 mounting transverse hinge pins 152 coaxially aligned with the rack element hinge pin 135 (FIGURE 12). Mounted on these hinge pins 152 and interleaved between the bushings 151 are bearing sleeves 153 secured to the bifurcated end portions 154 of a lifting platen 155. This platen 155 is substantially rectangular in plan and overlies the upper planar extremity of the rack element 137, the end portion 138 of the rack element remote from the hinge pin 135 bearing against the undersurface of the platen to elevate the platen upon energization of the electric motors 145 and driving of the pinion 142 through the gear changer unit 144 and the input gear 143. The pinion 142 contacting the segmental gear surface defined by the rack sections 140 will elevate the rack element 137 and the platen 155 in a counterclockwise direction, as illustrated in FIGURE 10, for a purpose to be hereinafter more fully described.

Forwardly of the hinge bushings 151, the side plates 130 are provided with transversely aligned, generally vertically extending surfaces 156, and the inner plates 132, forwardly of their guide bushings 134, are provided with substantially coincident surfaces 156 to define a forward well section for receiving the chute 101. Preferably, this well surface is reinforced by steel plates defining a generally arcuate bottom 160 merging into an upstanding forward support element 161 which is quite massive and which projects forwardly from the forward truck 116. This support element or arm 161 comprises a lower forwardly and upwardly inclined portion 162 provided with a central cut-out 163 and a generally vertically extending terminal portion 164 also provided with a central cut-out 165.

At the extreme upper end of the arm, two chute supports 166 are provided, as will be hereinafter described in greater detail. At the lowermost portion of the well provided by the bracket 161 and the surfaces 156, 157 there are provided additional chute support elements 167 and 168, also as will be later described. The chute 101 thus is disposed in the well provided therefor adjacent the forward end of the frame 115.

The chute 101 is preferably a cast structure of eleven to fourteen percent manganese steel or fabricated from alloy steel, such as T-1 or NAX, and is provided with a bottom wall 170 merging through arcuate curved sections 171 into upstanding side walls 172. At its discharge end, the chute is arcuate in overall cross-sectional configuration, the side walls being forwardly convergent toward the discharge end 173 of the chute. The rear of the chute is closed by a vertical end wall 174 which has a lower extremity 175 which departs somewhat from a true arcuate shape because of the greater flatness of the bottom wall 170 of the chute adjacent the inlet end thereof.

Superimposed on the chute 170 is a fabricated shield 176, this shield preferably being lined, at least partially, with abrasion resistant steel plate. Preferably, the shield comprises an upstanding rear wall 177 and a forwardly projecting side wall 178 joined by an arcuate medial portion 179. From the plan view of FIGURE 8, the forward convergence of the chute side walls 172 and the curved medial wall 179 of the shield overlying the chute may be easily seen.

The chute and shield are supported by a fabricated carriage 180 from which supporting webs 181 project into supporting conformity with the chute 170 and the shield 176.

The lower support 167 at the discharge end 173 of the chute is preferably ball mounted so as to accommodate angular deflection between the chute and the rigid frame. The rear support 168 for the undersurface of the chute comprises a pair of spaced portal-type links securing the chute supporting structure 180 to the rear of the arm 162 through ball and ball seats 182 adjacent the chute and provided with a resilient or fluid actuated shock absorber 183. Lateral stability is secured through two links 166 secured to the supporting structure 180 through ball ends 184 and to the upstanding support post 164 through double acting spring action shock absorbers 185 to accommodate chute-frame movement due to the loads imposed on the chute during use.

Poistioned above the platen 155 is the hopper 102 for containing a body of scrap to be fed to the furnace. Actually, the hopper when in its position illustrated in FIGURE 10 of the drawings does not rest upon the platen 155 but rather upon pads carried by the side plates 130.

More specifically, the hopper consists of side walls 190 joined by a rear or end wall 191 and at the other end by a relatively short vertical wall 192 (FIGURE 11) forming at its upper surface a pouring lip 193. The side walls 190 and rear wall 191 are ribbed for reinforcement and a pair of channeled trunnion straps 194 encompass the side and bottom walls of the hopper 102. The rear sill 123 bears a shock absorbing pad 195 contacting the rear trunnion strap 194. An identical pad 195 is carried by each of the side plates 130 to contact the forward trunnion strap 194. Additionally, the lower front corners of the side plates 190 of the hopper are arcuately recessed, as at 196 (see FIGURES 10 and 11) to receive aligning projections 197 projecting upwardly from the frame side walls 130. The hopper 102 is provided with a bottom wall 199 underlying a false bottom 200 provided with a series of steps 201, 202, 203, 204 similar to the steps heretofore described in connection with the embodiment of FIGURES 1 through 6.

The inclination of the steps increases from the horizontal in increments, preferably on the order of five to ten degrees. Further, the steps 201–204 are inclined downwardly toward the hopper side wall remote from the chute lip or exit end 173, the degree of inclination being also about five to ten degrees.

In use, the hopper 102, filled with material to be loaded, is positioned, as illustrated in FIGURE 10, with the trunnion straps 194 contacting the shock absorbing pads 195 and with the wall projections 197 in the arcuate slots 196. To elevate and position the hopper, and to remove the hopper after dumping, laterally projecting trunnions 205 are provided adjacent the upper extremity of the trunnion straps 194.

As illustrated in FIGURES 10 and 12, the platen 155 adjacent its rear edge carries a pair of spaced, frusto-conical locating pins 206 each of which is insertable into a conforming conical recess 207 in the bottom 199 of the hopper when the platen is initially elevated by the motor 145 (through rotation of the pinion 142 in contact with the rack segments 140). Preferably, additional contacting pads 208 are provided adjacent the other end of the platen 155 for contacting the undersurface of the hopper bottom 199.

*Operation of the embodiment of FIGURES 7 through 14*

As illustrated in FIGURE 7 of the drawings, a number of carriers or cars 103 bearing loaded hoppers 102 are positioned adjacent a series of vessels 104. The crane 107 removes a loaded hopper from a car 108 and transfers the hopper vertically and transversely into vertical alignment with the apparatus 100. Next, the crane lowers the loaded hopper onto the base 115. More specifically, the hopper is lowered until the trunnion straps 194 come into contact with the contact pads 195 and the projections 197 enter the openings 196. The location of these pads and the size of the arcuate opening 196 provides a substantial measure of leeway in the positioning of the hopper upon the base 115.

After the hopper is in position, the motor 145 is energized and, through the change speed gear set 144, the gear 143 and the pinion 142 are rotated, thereby elevating the platent 155 into contact with the undersurface of the hopper 102. The hopper and platen are located and maintained for subsequent co-movement by means of the locating pins 206 and the recesses 207. Initial elevation of the hopper will not dispense scrap therefrom until after the first step 201 passes arcuately through the angle of repose of the scrap. After the angle of repose is passed, scrap will be dispensed into the chute 101 and, as earlier explained, scrap will slide from each of the steps 202, 203 and 204 as these steps also pass through the angle of repose. Thus, scrap will be intermittently fed to the chute 101, even though the hopper is elevated at a substantially constant rate.

As best illustrated in FIGURES 8 and 9, tilting of the vessel 104 aligns the vessel with the longitudinal axis of the chute 101, but the longitudinal axis of the chute 101 is disposed ninety degrees to the longitudinal axis of the hopper 102, i.e., normal to the direction of dispensing of the scrap from the hopper. The size of the exit end 173 of the chute is preferably somewhat less than the inlet opening of the vessel 104.

As best seen in FIGURES 13 and 14, scrap dispensed longitudinally from the hopper 102 will be impacted on the chute 101 with substantial momentum and will enter the chute 101 with substantial momentum, due to the gravitational forces exerted thereon. The scrap, illustrated in FIGURE 13 of the drawings as a single piece for clarity of illustration, enters the chute adjacent the upper extremity thereof, contacts the shield 176 somewhere in the vicinity of the curved section 179 thereof and is deflected transversely by such contact. Depending upon the size of the scrap, its mass, and the momentum of the scrap piece, it will be deflected back into the chute and will contact either the side walls 172 or the arcuate joining portions 171 of the chute for deflection toward and travel through the discharge end 173 of the chute.

Inasmuch as the direction of discharge of the chute lies normal to the direction of discharge of the hopper, most of the scrap passing from the hopper into the chute will be deflected through an angle of substantially ninety degrees. The effect of such deflection is to impart a spiral trajectory to the scrap, the degree of the trajectory depending upon the extent of interference with movement of the scrap by the chute, by other scrap portions simultaneously passing through the chute, and by the mass and size of the scrap itself.

All in all, it has been found, through experimentation, that the scrap will be deflected readily and during its passage through the chute will not only be deflected but will be turned and tumbled into alignment with the longitudinal axis of the chute for easy passage through the inlet opening of the vessel, into the vessel proper. Additionally, the deflection of the scrap and the imparting of a spiral trajectory thereto, together with the effect exerted by the substantial reduction in the cross-sectional area of the chute at its outlet opening will result in the actual spreading or fanning out of the scrap after it passes through the chute outlet opening for dispersion across the interior of the vessel.

As explained earlier, the steps 201–204 are inclined toward that side wall of the hopper most remote from the vessel, so that the majority of the scrap enters the chute adjacent the rear wall 177 or the curved wall 179 thereof, and the entrance of the scrap at this point materially increases the deflection and spiralling of the scrap as it passes through the chute.

Following the dispensing of the scrap load of the hopper through the chute 101, the hopper 102 is lowered to its position of FIGURE 10 in which the hopper rests upon the pads 195. Such movement, of course, is accomplished by the clockwise movement of the platen 155, the rack 137 and the gear segments 140 by reverse rotation of the pinion 142.

Next, the empty hopper is removed from the assembly by engagement of the crane 107 with the hopper 102, followed by crane movement to elevate, transversely move, and replace the hopper upon the flat cars 108. Next, another loaded hopper 102 can be placed in the mechanism 100 by the crane 107 to dispense the next load of scrap to the same or different vessel 104.

Preferably, the vessel size and the hopper size are correlated, so that a hopper 102 will contain a complete scrap charge for a given vessel 104. Thus, scrap charges ranging from sixty to one hundred tons can be contained within and dispensed by a single hopper.

During the dumping of the contents of hopper 102 into the chute 101, the weight of the hopper plus the weight of the hopper contents must be elevated about the hinge pins 135 and 152. The weight of the hopper and its contents is supported by the platen 155 and is interposed directly on the hinge pins 152. The thrust of the driving element or rack 137 is imposed on the hinge pin 135. By separating these two loads distortion of the drive mechanism by the imposition of any unbalanced or uneven load of the hopper and contents on the rack is avoided.

It will be noted that no attempt is made to support the chute 101 rigidly on the supporting mechanism 115. The chute will be subjected to substantial dynamic loads during the pouring of the scrap through the chute, and the chute is supported resiliently by the shock absorbing connections 166, 167, 168. Thus, slight but controlled relative chute-support movement is accommodated under the dynamic loads imposed thereon.

Further, by virtue of the utilization of a plurality of hoppers and a single support structure and chute, a plurality of vessels 104 can be serviced by a single, relatively more expensive structure 100 and a plurality of simple, relatively inexpensive hoppers. Thus, only one set of trucks 116–118, one car drive mechanism 125, a single support structure 115, a single hopper elevating drive 140–145, a single platten 155 and a single chute 101 is required. The resultant substantial savings will be obvious.

The embodiment of FIGURES 15 through 22

In that embodiment of the invention illustrated in FIGURES 15 through 22, the structure is substantially the same as illustrated in FIGURES 7 through 14. Therefore, identical reference numerals in FIGURES 15 through 22 refer to identical portions of the apparatus illustrated in FIGURES 7 through 14.

While the hopper 248 is of somewhat different shape, as may be readily seen by a comparison of FIGURES 10 and 16, the hoppers are substantially identical. Further, the platens 155, segmental gears 140, pinions 142 and drive mechanisms are substantially the same in structure and identical in function. One important difference is that the hopper 248 is permanently attached to the overall supporting structure 249 and is disposed on pivot pin 250 through a pivot bearing 251 carried by a bearing bracket 252 formed at the forward end of the hopper.

Additionally, it will be noted that the function and overall shape of the chute 255 per se and the shield 256 are substantially the same, but are differently mounted upon the undercarriage or carrier. More particularly, the chute 255 is carried by a generally V-shaped yoke 260 having upwardly and outwardly inclined front arms 261 joined by an arcuate lower bight portion 262. The yoke arms each carry rearwardly projecting extensions 263 terminating in upturned vertical rear yoke arms 264 generally parallel to the front yoke arms 261. The forward bight portion 262 of the yoke and the rear ends of each of the extensions 263 are provided with ball and shock absorbers 265 similar to the shock absorbers 167 heretofore disclosed. The entire yoke and shock absorber structure is best illustrated in FIGURES 16 and 17.

The chute 101 is also supported by a vertically extending support arm 266 integrated into the undercarriage structure and similar to the upstanding arm 164 of FIGURE 10. The upper end of the arm 266 is joined to the chute to stabilize the same laterally through suitable shock absorbers 267, similar to the shock absorbers 166 heretofore described.

While the chute 255 is generally similar to the chute 101 heretofore described, there is one important difference.

As can be best seen from FIGURES 15 and 17, the forepart of the chute 270 is separate from the rear part of the chute 271. The two chute sections 270 and 271 are supported for relative movement by the yoke 260.

More particularly, the yoke 260 supports a slide rod 271 secured in collars 276 surmounting the yoke arms 261 and 264. Additional laterally and downwardly extending arms 277 are welded to the exterior surface of the upper chute portion 271 and project into fixed attachment to the support collars 276. Slidably supported on the slide rod 275 are a pair of slide bearing bushings 278 rigidly secured to arms 280 which joint the bushings 278 to the forward chute section 272.

Secured to the lower or slidable chute section 272 is a pivot length 281 pivotally connected to one end of a bell crank 282 medially pivoted, as at 283, to the support posts 266. The lower end of the bell crank is pivoted to a longitudinally displaceable rack 283 meshing with a pinion 284 adapted to be energized by a combined motor and speed change unit 285.

The two cast chute sections 270 and 271 are provided with bottom surfaces 286 and 287 which register when the chute sections are in their positions of FIGURE 18 to form a smooth uninterrupted bottom surface for the chute 255. Similarly, the side walls 288 and 287 are in registry to provide a smooth dispensing surface for the chute sides when the chute sections are positioned, as shown in FIGURE 18. The upper marginal edge of the lower chute section 288 and the lower marginal edge of the upper chute section 271 are each provided with laterally outturned flanges 290 which are parallel to the longitudinal axis of the slide rod 275. These flanges 290 remain in constant contact and are in exact mating registry when the two chute sections are positioned, as shown in FIGURE 18. Thus, a smooth inner side wall surface is presented, the free edges of the chute side walls are reinforced, and sliding contact between the two chute sections is maintained by the flanges 290.

In FIGURES 19 through 22, a different form of chute extension 310 is illustrated. This chute extension is preferably utilized for the introduction of scrap into open hearth furnaces or the like and is particularly well adapted for utilization with the form of the invention shown in detail in FIGURES 15 through 18.

Structurally, the chute extension 310 comprises vertically extending, substantially parallel side walls 311 having vertical front edges 312 and a generally triangular bottom wall 313 having a front edge 314 lying at right angles to and interposed between the front edges 312 of the side walls. The convergent side edges 315 of the triangular bottom wall 313 and the forwardly and downwardly sloping bottom edges 316 of the side walls 311 are joined by arcuate joining portions 317. The arcuate joining portions 317 are in the shape of conic sections having their apices 318 merging into the lower corners at the delivery end of the chute extension defined by the front edges 312 and 314 of the side walls 311 and the bottom wall 313, respectively.

The rear edges of the side walls 311 cooperate with the rear curved edges of the joining portions 317 to define an overall arcuate opening 320 having an outwardly directed flange 321 of corresponding contour and adapted to be attached to the lower end of the chute 270 so that the extension 310 projects into the charging door 301 of the open hearth furnace 300, as illustrated in FIGURES 19 and 20.

*Operation of the embodiment of FIGURES 15 through 22*

The operation of the third embodiment of the present invention is well illustrated in FIGURES 15 and 22, and by comparison of the FIGURES 17 and 18.

More specifically, the apparatus of this embodiment of the invention is particularly adapted for use with open hearth furnaces. Inasmuch as the open hearth furnace occupies a fixed position, as contrasted with the tiltable oxygen reduction vessel 104 heretofore described, and further since the open hearth furnace 300 has a fixed charging port 301 closely adjacent the rails 302 over which the apparatus 249 is movable, it is necessary to insert the discharge end of the chute 255 into the furnace charging aperture 301.

In use, the charging aperture door 303 for the specific aperture 302 is opened, the complete apparatus 249 is positioned relative to the furnace, as indicated in FIGURES 15 and 18, and the lower or forepart 270 of the chute is inserted into the charging aperture 301.

Such insertion is accomplished by actuation of the driving unit 280 to effect rotation of the pinion 284, thereby moving the rack 283 to the left (FIGURE 17). In this manner, the bell crank 282 is rotated about its pivot 283 in a clockwise direction and the arms 280, the collars 278 and the forepart 270 of the chute is actuated to the right from its position of FIGURE 17 to its position of FIGURE 18. It will be noted that the slide rod 275 is slightly inclined upwardly and forwardly, i.e., toward the charging aperture 301. Consequently, the forepart of the chute is elevated slightly during its movement to its extended position of FIGURE 18. Such forward and upward movement is desired in order to position the forepart of the chute 270 and the exit end thereof as high as possible within the furnace without interference with the upper marginal edge of the charging aperture 301.

Following the positioning of the chute in the charging aperture, the hopper is elevated, scrap is poured from the hopper into the chute for passage therethrough and through the charging aperture 301, into the interior of the open hearth furnace proper, 300.

As heretofore explained in connection with the earlier ly described second embodiment of applicant's invention, the scrap is turned during its passage through the chute and a spiral, forward motion is imparted thereto. As the scrap leaves the chute with this spiral motion, it spreads laterally for a desired lateral coverage of a substantial interior area of the open hearth furnace. Due to this lateral spreading, it may well not be necessary to introduce a scrap charge through each and every charging aperture 301 of the open hearth furnace. Of course, the use of each charging aperture, or each alternate charging aperture, is dependent upon the amount of scrap to be introduced, the distance between adjacent charging apertures, and other factors. In any event, a substantial reduction in the charging time for open hearth furnaces is possible by utilization of the structure illustrated in FIGURES 15 through 18, inclusive.

Inasmuch as the hopper 248 is integral with the overall unit 249, the complete scrap charging apparatus 249 is removed to a loading position at which the hopper is refilled with scrap following the complete discharge of the hopper into the furnace and the retraction of the chute to the position of FIGURE 17. Obviously, the integral hopper 248 may be utilized in conjunction with the other embodiments of applicant's invention illustrated in FIGURES 1 through 14, while the embodiment of the invention illustrated in FIGURES 15 through 18 may equally well be provided with a removable hopper, as earlierly explained in connection with FIGURES 1 through 14.

The operation of the extension 310 illustrated in FIGURES 19 through 22 is substantially the same as heretofore described in connection with the embodiments of FIGURES 15 through 18, in that charging apparatus is positioned so that the extension 310 projects through the charging aperture 301. Scrap flowing through the chute is discharged from the extension into the interior of the open hearth furnace 300. The chute exit end is arcuate and registers accurately with the rear edge 320 of the extension. The extension then goes through a transition from the arcuate edge 320 to the substantially rectilinear opening defined by the edges 312 and 314. During flow through this transition space provided by the extension, the scrap spreads laterally and is discharged with substantial lateral dispersion without interfering materially with the flow of scrap therethrough. Actually, the area of the dispersion end of the extension is greater than the area inlet end and, therefore, the scrap, traveling through the extension under substantial pressure from following scrap portions, is allowed to spread laterally so as to obtain better lateral dispersion. The effect is much like the flow of water through a nozzle having laterally directed surfaces, since the scrap, having started to spread laterally during passage through the extension, will continue to so spread during its free fall into the furnace 300.

In the charging of electric furnaces, either of the apparatus described or a combination may be utilzed.

Summary

To summarize the functional aspects of the present invention, the following aspects thereof are again emphasized:

(1) The scrap is poured through the chute and the restricted charging aperture into the interior of the furnace. The scrap flows and handles like a fluid, thereby making possible the handling of vast amounts of scrap within extremely short, heretofore unattainable, charging times.

(2) The scrap is introduced under substantial initial momentum into the empty chute for flow therethrough, orientation therein, and discharge therefrom. The scrap within the chute is always in a dynamic state, never in a static state. The momentum is such that the kinetic energy of the scrap is sufficient to maintain its flow through the chute despite some energy loss in the chute due to interference of the chute with the scrap flow and interference between various portions of the scrap. Actually, the scrap will lose momentum during its flow through the chute, due to the interference forces, but the scrap maintains its dynamic state throughout its passage through the chute.

(3) The chute is effective to orient elongated pieces of scrap into longitudinal alignment with the chute exit portion and with the charging aperture, thereby making possible the feeding of scrap of any practical size and/or shape encountered in normal steel making operations. The orientation of the elongated scrap pieces is accomplished by interference between the scrap and the chute, and between various portions of the scrap itself.

(4) In the feeding of large quantities of scrap, the scrap is preferably introduced intermittently onto the chute in batches so as to avoid clogging of the chute and to insure the maintenance of dynamic conditions within the scrap at all times.

(5) Batch feeding of the scrap is preferably obtained by utilization of a tiltable body aligned with the entrance end of the chute and having a stepped bottom therein to batch feed the scrap therefrom.

(6) The tiltable body, in that embodiment of the invention in FIGURES 1 through 6, is longitudinally aligned with the exit end of the chute as well as with the entrance end of the chute. Interference with flow of scrap through the chute will thus cause the scrap to turn and tumble about a substantially straight line longitudinal mean path of scrap flow.

(7) In that embodiment of the invention illustrated in FIGURES 7 through 18, the tiltable body is disposed normally to the exit end of the chute and the scrap is forced to negotiate a turn of about ninety degrees. Thus, the scrap not only is turned and tumbled for orientation, due to interference between the scrap and the chute and between the various portions of the scrap, but a spiral motion is also imparted to the scrap to increase the orientation of elongated portions thereof and also to enhance the lateral dispersion of the scrap after it has left the chute and entered the furnace.

(8) In the embodiment of the invention utilizing the curved chute, the stepped bottom of the hopper is also preferably inclined away from the exit end of the chute so as to force scrap issuing therefrom toward the point of maximum curvature of the chute. Thus, the spiralling effect is increased and greater scrap dispersion within the furnace is obtained.

(9) Preferably, in the loading of the hopper, heavier portions of the scrap are placed in the hopper toward the rear end thereof, while lighter scrap portions, such as sheet stock, hollow scrap articles, and the like, are placed toward the forward end of the hopper. Thus, the lighter scrap is initially fed through the chute and poured into the furnace to provide a cushion for the subsequently introduced, denser scrap portions, so as to aid in protecting the furnace lining and to reduce the shock load on the furnace and the furnace supporting structure.

(10) By the utilization of the telescoping chute structure integrated into the embodiment of FIGURES 15 through 18, it is possible to utilize applicant's novel scrap pouring technique in conjunction with open hearth furnaces. The advantages of faster scrap loading, better scrap dispersion within the furnace, orientation of elongated scrap portions, and the like for open hearth operations will be readily appreciated.

(11) The use of the tilting hopper 102 possesses one further advantage, namely, the scrap on the rearmost step is discharged last from the hopper and from a substantial height. This last discharge scrap thus will have the greatest momentum and will tend to sweep from the chute all of the earlierly discharged scrap therein. In fact, the scrap is impacted upon the chute with increasing momentum throughout the tilting of the hopper and the force of the scrap flow will be increased to a maximum through the entire scrap feeding period.

Having thus described my invention, I claim:

1. In a method of feeding scrap to a steel making furnace having a restricted charging aperture, the steps of progressively dropping scrap with increasing kinetic energy on the inlet end of a chute for flow therethrough to an exit end, orienting said scrap into alignment with the direction of flow by impacting it on the chute with sufficient kinetic energy to cause those scrap portions having a tendency to jam therein to turn and tumble due to interference between the scrap and the chute walls and between various portions of the scrap, discharging the oriented scrap from the chute exit end into the furnace, and dispersing the scrap in the furnace in accordance with the kinetic energy imparted to progressive portions thereof.

2. The method of feeding scrap to a steel making furnace having a restricted charging aperture comprising the steps of intermittently feeding scrap onto a chute with sufficient momentum to establish and maintain the flow of scrap through the chute, deflecting the scrap horizontally through an angle of about ninety degrees to drastically change the direction of scrap flow through the chute while turning and tumbling the scrap therein due to interference between the scrap and the chute and between various portions of the scrap, whereby elongated portions of the scrap are oriented into longitudinal alignment with the direction of scrap flow, and discharging the oriented scrap from the chute through the charging aperture.

3. In an apparatus for rapidly charging scrap through a charging aperture into a steel making furnace, an open topped chute having spaced angularly related inlet and outlet ends joined by a substantially vertical wall arcuate about a vertical axis, the outlet end of said chute being alignable with the charging aperture, a tiltable hopper longitudinally aligned with the inlet end of said chute and movable arcuately about a horizontal axis adjacent the chute inlet end, and power means for moving the hopper about said axis, said hopper being adapted to contain scrap for introduction into the inlet end of said chute with substantial momentum and in a direction having a horizontal component toward said arcuate chute portion, said scrap during its travel through said chute being deflected substantially horizontally by said arcuate chute portion toward said outlet.

4. In a method of feeding scrap to a steel making furnace through a restricted charging aperture the steps of positioning a chute adjacent the charging aperture, impacting scrap on the chute for flow thereover with substantial momentum, radically changing the direction of flow of the scrap during its flow through the chute, the interference of the chute and the scrap thereon with the free gravitational fall of the scrap causing the scrap to turn and tumble in the chute and the radical change in direction of flow inducing a spiral movement in the scrap, and discharging the scrap from the chute with substantial momentum and in a free fall trajectory, the trajectory of the scrap and the spiral movement thereof distributing the scrap both longitudinally and laterally in the furnace.

5. A method of feeding scrap to a steel making furnace having a restricted charging aperture wherein it is an important factor to introduce the complete scrap charge as rapidly as possible, comprising the steps of impacting scrap on a convergent chute having an exit end which has a transverse dimension less than the greatest dimension of at least some of the scrap, said scrap being impacted on the entrance portion of said chute with sufficient momentum to cause those scrap portions having a tendency to jam therein to turn and tumble, thereby causing orientation of such scrap portions lengthwise of the chute due to interference between the scrap and the chute walls and between various portions of the scrap, and introducing the oriented scrap through the charging aperture directly from the chute in a free fall trajectory due to residual momentum in the scrap from the initial impacting step.

6. In an apparatus for rapidly charging scrap through a charging aperture into a steel making furnace, an inclined chute having an inlet end and a discharge end alignable with the charging aperture, a tiltable body longitudinally aligned with the inlet end of the chute, said body having an interior scrap-receiving space overlying a bottom wall having a plurality of steps therein of increasing angularity from the horizontal in a direction away from the chute inlet end, and means to tilt the body toward the vertical at a substantially constant rate to pour scrap therefrom into the chute with substantial momentum, the bottom wall steps intermittently releasing scrap from the body.

7. In a method of feeding scrap to a steel making furnace having a restricted charging aperture wherein it is an important factor to introduce the complete scrap charge as rapidly as possible, the steps of gravitationally impacting scrap on the inlet portion of a chute having a reduced outlet portion joined thereto by a curved medial portion, turning and tumbling the scrap during its passage through the chute due to interference between the scrap and the chute walls and between various portions of the scrap, imparting an overall spiral motion to the scrap due to its passage through the curved medial portion of the chute, and ejecting the scrap from the reduced outlet portion in a free fall spiral trajectory effective to spread the scrap laterally after ejection.

8. A method of charging miscellaneous scrap through a charging aperture of one furnace of a series of steel making furnaces situated side by side in battery form and having a charging floor along the front thereof, comprising loading said scrap in bulk at a loading station, delivering the bulk loaded scrap to the charging floor, removing successive quantities of scrap from said bulk scrap, impinging the successive quantities of scrap on an orienting surface to substantially align the scrap with said charging aperture, and introducing the oriented scrap through said charging aperture into said furnace.

9. In an apparatus for rapidly charging scrap through a charging aperture into a steel making furnace, a tiltable body having an interior scrap-receiving space overlying a bottom wall, said space having an open end defining an outlet opening, and said bottom wall having a plurality of steps therein of increasing angularity from the horizontal in a direction away from the outlet thereof, and means to tilt the body to elevate the remainder of the body relative to the outlet at a substantially constant rate to pour scrap from the body and through the outlet thereof with substantial momentum, said bottom wall steps intermittently releasing scrap from the body as said steps progressively assume an angularity with respect to the horizontal equivalent to the angle of repose of the scrap.

10. The method of charging miscellaneous scrap through a charging aperture of a steel making furnace having a charging floor, characterized by the steps of delivering bulk loaded scrap to the charging floor, removing successive charges of scrap from the bulk scrap, successively and uninterruptedly flowing the individual scrap charges with substantial momentum along an arcuate orienting surface to substantially align the scrap with the charging aperture, and introducing the oriented scrap through the charging aperture into the furnace.

11. In an apparatus for rapidly charging scrap through a charging aperture into a steel making furnace, an inclined chute having an inlet and a discharge end alignable with the charging aperture, a tiltable body longitudinally alignable with the inlet end of the chute and adapted to contain scrap, means to tilt the body, and means on said body for intermittently introducing scrap therefrom into the chute with substantial momentum.

12. In an apparatus for rapidly charging scrap through a charging aperture into a steel making furnace, an inclined chute having an inlet end and a discharge end alignable with the charging aperture, a removable scrap storage body longitudinally aligned with the inlet end of said chute, and means to tilt the body to introduce scrap therefrom into the chute with substantial momentum, said last named means including a platen underlying said body for contact therewith, platen pivoting means supporting said platen for pivoted movement toward the inlet end of said chute, interengaging means on said body and said platen to secure said body to said platen for joint pivotal movement, and power means for pivoting said platen and said body in contact therewith 13. In a method of feeding scrap to a steel making furnace through a restricted charging aperture, the steps of positioning adjacent the charging aperture a chute having spaced inlet and outlet portions, discontinuously impacting scrap on the chute inlet portion, flowing the scrap after impact and with substantial momentum through said chute, orienting the scrap during its flow through the chute by the interference of the chute and the scrap thereon with the free gravitational fall of the scrap, the momentum imparted to the scrap by the impacting step being sufficient to continuously flow scrap through said chute despite the interference of the chute with the scrap flow, and discharging the scrap from the chute with substantial residual momentum.

14. In an apparatus for rapidly charging scrap through a charging aperture into a steel making furnace, an inclined chute having spaced inlet and outlet ends joined by arcuate substantially vertical wall, the outlet end of the chute being alignable with the charging aperture, and means for controllably impacting scrap on the inlet end of the chute to direct the scrap in a first direction having a horizontal component with substantial momentum, said scrap during its travel through the chute being deflected substantially horizontal from said first direction and toward said outlet by said arcuate vertical chute wall.

15. In a method of feeding scrap to a steel making furnace through a restricted charging aperture, the steps of positioning a chute at the charging aperture, releasing onto the chute from progressively increasing heights separate quantities of scrap, impacting such separate scrap quantities on the chute by virtue of the kinetic energy imparted thereto prior to contact of the scrap with the chute, the kinetic energy input increasing proportionally with the increase in height of release thereof, turning and tumbling each scrap quantity by the interference of the chute and the scrap thereon with the free flow of the scrap quantity in the chute, forcing all of the scrap quantity through the chute by the pressure exerted by the following scrap portions and discharging each such scrap quantity from the chute with substantial residual kinetic energy sufficient to carry the scrap well into the furnace for distribution therein.

16. In a method of feeding scrap as defined in claim 15, the further improvement of releasing onto the chute from progressively increasing heights separate quantities of scrap of progressively increasing density and mass, utilizing the lighter scrap initially fed through the chute to provide a cushion interiorly of the furnace for the subsequently introduced scrap portions of greater density and mass, and utilizing the subsequently introduced scrap portions of greater density and mass to advantageously distribute all of the scrap interiorly of the furnace.

References Cited by the Examiner

UNITED STATES PATENTS

| | | |
|---|---|---|
| 617,663 | 1/1899 | Tompkins. |
| 1,273,391 | 7/1918 | McClure et al. |
| 1,758,208 | 5/1930 | Warnecke. |
| 2,551,278 | 5/1951 | Millan. |
| 2,656,055 | 10/1953 | Longenecker. |
| 2,836,309 | 5/1958 | McFeaters |
| 3,093,253 | 6/1963 | McFeaters et al. |

GERALD M. FORLENZA, *Primary Examiner.*

HUGO O. SCHULZ, *Examiner.*